United States Patent
Depew et al.

(10) Patent No.: US 7,028,215 B2
(45) Date of Patent: Apr. 11, 2006

(54) HOT MIRRORING IN A COMPUTER SYSTEM WITH REDUNDANT MEMORY SUBSYSTEMS

(75) Inventors: Kevin G. Depew, Kingwood, TX (US);
Jeoff M. Krontz, Tomball, TX (US);
John D. Nguyen, Cypress, TX (US);
David F. Heinrich, Tomball, TX (US);
David W. Engler, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 10/178,981

(22) Filed: Jun. 25, 2002

(65) Prior Publication Data

US 2003/0208650 A1    Nov. 6, 2003

Related U.S. Application Data

(60) Provisional application No. 60/377,863, filed on May 3, 2002.

(51) Int. Cl.
*G06F 11/00* (2006.01)

(52) U.S. Cl. ........................................ 714/7
(58) Field of Classification Search ............ 714/7; 710/302, 104
See application file for complete search history.

(56) References Cited

U.S. PATENT DOCUMENTS

| | | | | |
|---|---|---|---|---|
| 5,124,987 A | * | 6/1992 | Milligan et al. | 714/7 |
| 5,239,659 A | * | 8/1993 | Rudeseal et al. | 714/6 |
| 6,223,301 B1 | * | 4/2001 | Santeler et al. | 714/6 |
| 6,430,702 B1 | * | 8/2002 | Santeler et al. | 714/6 |
| 6,467,048 B1 | * | 10/2002 | Olarig et al. | 714/7 |
| 2002/0194530 A1 | * | 12/2002 | Santeler et al. | 714/6 |

* cited by examiner

*Primary Examiner*—Bryce P. Bonzo

(57) ABSTRACT

A computer system implements hot mirroring for main system memory. That is, the computer system permits a user to hot plug a new memory board into the system and the system will respond by switching to a mirrored memory mode in which write cycles are performed to both memory boards (new and old). Once a new board is hot plugged into the system, the contents of the old board are copied over, in a background mode, to the new board so that both boards will have the same data. Because this background copying process may take a non-trivial amount of time and may detrimentally interfere with other system traffic, the system a user to exert control over the relative speed of the background copying so as to trade-off the time it takes to switch over to the mirroring mode versus the impact on on-going system behavior.

23 Claims, 3 Drawing Sheets

HOT MIRRORING IN A COMPUTER SYSTEM WITH REDUNDANT MEMORY SUBSYSTEMS

CROSS-REFERENCE TO RELATED APPLICATIONS

This application claims priority to a provisional application entitled "Advanced Memory Protection," Ser. No. 60/377,863, filed May 3, 2002, and incorporated herein by reference. Also, this application may contain information somewhat relevant to copending and commonly owned application entitled "Computer System Architecture With Hot Pluggable Main Memory Boards," Ser. No. 10/179,001, filed on Jun. 25, 2002 and incorporated herein by reference.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to computer systems and computer system architectures for implementing hot pluggable main memory. More particularly, the preferred embodiments are directed to servers having an architecture that supports hot-pluggable memory capable of fault tolerant and non-fault tolerant modes. More particularly still, the preferred embodiments are directed to implementing a computer system capable of accommodating two or more hot pluggable memory boards and capable of switching from a non-fault tolerant memory mode to a fault tolerant mode upon the hot insertion of a new memory board.

2. Background Information

Computer system designs have been developed for a variety of applications. For some mission critical applications (e.g., Internet Service Providers) it is more imperative that the system function properly and continuously. Some businesses or organizations operate 24 hours per day, 7 days per week and thus, as much as possible, should have their computer systems up and running all of the time. Even for those organizations that do not operate 24 hours per day, it still may be highly desirable for the computer systems to remain fully operational during normal business hours.

Maintaining a computer system fully and continuously operational can be very challenging since failures of computer system components can and will occur and can occur without warning. In conventional computer systems, such failures can bring the system operations to a halt. During a maintenance event, the computer will be shut down to permit the defective part to be replaced. Then, the system is rebooted. This process can be very time consuming and bothersome in any application, particularly in mission critical applications.

The desire for the elimination, or at least minimization, of down time has led computer system designers to build fault tolerant features into the system's design. For example, the main memory of a computer can be made fault tolerant by designing the system to accommodate two redundant memory boards. Each memory board may be identical to the other board. With redundant memory boards, a "mirroring" mode can be implemented such as that described in copending application Ser. No. 10/179,001, entitled "Computer System Architecture With Hot Pluggable Main Memory Boards" in which one board is designated the "active" board and the other is operated in a mirrored mode. As such, all memory writes are performed to both boards so that both boards have identical data. A memory read is taken from the active board. In this way, if one board fails, the other board still has all of the needed data (i.e., no data is lost) and the system can continue operating. If desired, the failed memory can be replaced, if at all, at a convenient time that has little impact on the organization's business activity.

Such a system can be shipped to a customer, however, with only one memory board in place. This single memory board configuration, of course, will be non-fault tolerant meaning that a failure of the single memory board will cause the memory subsystem to fail altogether. If the user desires to upgrade the system into a fault tolerant memory mode, the user will have to add a second memory board. This upgrade will require the user to power down the computer, insert the second memory board, reboot the system into a configuration utility in which the user will select the mirroring mode, and then reboot the system back into the operating system. The process itself of switching to a fault tolerant mode requires the system to be taken off-line which, as noted above, is undesirable. Accordingly, an improvement which addresses this problem would be highly desirable.

BRIEF SUMMARY OF SOME OF THE PREFERRED EMBODIMENTS

The problems noted above are solved in large part by a computer system that implements "hot mirroring." That is, the computer system permits a user to hot plug a new memory board into the system and the system will respond by switching to a mirrored memory mode in which write cycles are performed to both memory boards (new and old). Once a new board is hot plugged into the system, the contents of the old board are copied over, in a background mode, to the new board so that both boards will have the same data. Because this background copying process may take a non-trivial amount of time and may detrimentally interfere with other system traffic (e.g., reads and writes caused by applications running on the system), the system permits a user to program a register associated with the memory controller to exert control over the relative speed of the background copying relative to other system traffic so as to trade-off the time it takes to switch over to the mirroring mode versus the impact on on-going system behavior.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

In accordance with the preferred embodiments of the invention, a computer system provides a hot pluggable memory subsystem in which two or more memory boards can be hot plugged into, and hot removed from, the system. Further, if the system currently has only one memory operating in a non-fault tolerant mode, a user can hot plug a second memory board into the system and the system will respond by automatically switching to a mirrored memory mode. In a background operation, the system will copy the contents of the existing memory board to the newly installed memory board and the system will continue operating by performing write cycles to both boards and read cycles to one of the boards designated as the active board. In that the computer permits a memory board to be hot plugged into a powered on system and automatically switches to a mirroring mode, the system is said to provide a "hot mirroring" capability.

Figure 1:
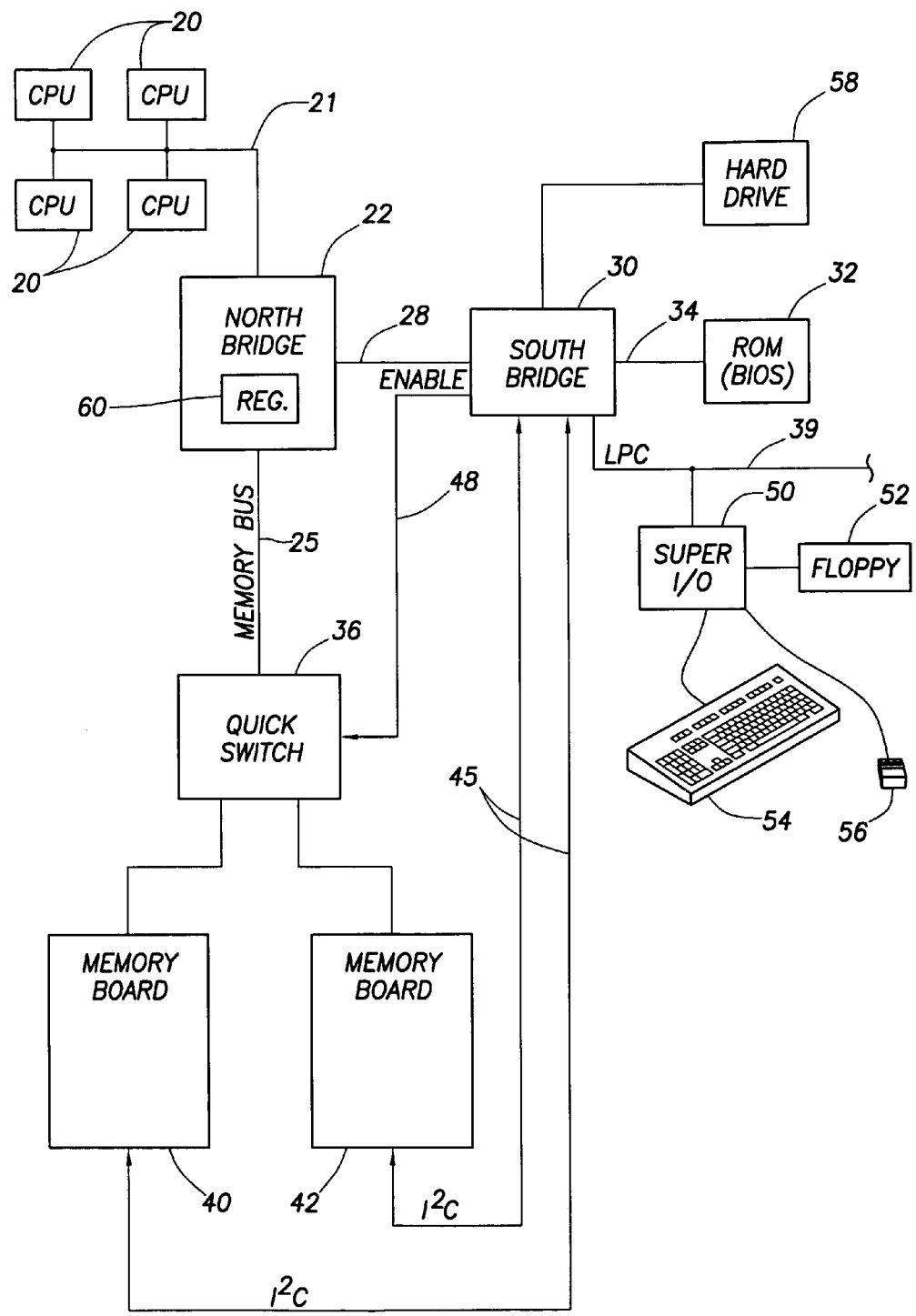
FIG. 1 shows, in block diagram form, a computer system implemented in accordance with the preferred embodiments.

Referring now to FIG. 1 a computer system is shown in accordance with the preferred embodiment. The system shown preferably, but not necessarily, is usable as a server system. The server system of the preferred embodiment of FIG. 1 includes one or more central processing units (CPUs) 20 coupled to one or more memory boards 40, 42 containing random access memory (RAM). The CPUs 20 couple to the memory boards 40, 42 by way of a north bridge 22 and quick switches 36. In the preferred embodiments, the CPUs 20 preferably comprise Intel® Pentium⁻4 XEON microprocessors; however, any suitable microprocessor or array of microprocessors may be used without departing from the scope and spirit of the invention. The CPUs 20 couple to the north bridge 22 by way of a host bus 21.

The memory boards 40, 42 preferably couple to the north bridge 22 through a memory bus 25. The north bridge 22 preferably comprises a memory control unit (not shown) that controls read and write transactions to the memory boards 40, 42 by sending the necessary control signals during memory accesses. The memory boards 40, 42 function as the working memory for the CPUs 20 and generally include a plurality of memory devices in which programs, instructions and data are stored. The memory boards 40, 42 may comprise any suitable type of memory such as dynamic random access memory (DRAM) or any of the various types of DRAM devices such as synchronous DRAM (SDRAM), extended data output DRAM (EDO-DRAM), double-data-rate SDRAM (DDR SDRAM), and the like. In the preferred embodiments however, the main memory arrays 4, 6 are implemented using DDR SDRAM packaged in dual inline memory modules (DIMMs).

The server system shown in FIG. 1 also preferably comprises a second bridge logic device 30 that bridges the primary expansion bus 28 to various secondary buses such as a ROM bus 34, a low pin count (LPC) bus 39 usable in conjunction with input/output devices such as a floppy drive 52, keyboard 54, mouse 56, and the like, as well as other busses (not shown) as desired. In the preferred embodiments, the north bridge 22 and the south bridge 30 are both members of a chipset produced by Server Works, Inc. More particularly, in the preferred embodiments the chipset utilized is Server Works' Grand Champion™ HE chipset.

Referring still to FIG. 1, a read only memory (ROM) 32 couples to the south bridge 30 by way of the ROM bus 34. The ROM contains software programs executable by the CPUs 20. The ROM 32 preferably contains not only the programs necessary to implement the basic input/output system (BIOS), but the ROM 32 also preferably stores stackless code executed during the power on self test (POST) procedures, as well as dedicated pieces of software code that are executed based on the issuance of system management interrupts (SMIs) by various system components. Implementing the hot mirroring functionality described herein involves, to a certain extent, software that is stored on ROM 32 and executed by CPU(s) 20.

The server system of the preferred embodiment also comprises a super input/output controller (Super I/O) 50 that couples to the south bridge 30 by way of the LPC bus 39. The Super I/O performs various functions, such as coupling a keyboard 54 and mouse 56 to the server, as well as being the coupling point for a floppy drive 52. Generally speaking, the Super I/O is referred to "super" because of the many input/output functions it performs. A hard drive 58 may also be coupled to the south bridge 30.

Each of the memory boards 40, 42 couple to the north bridge 22 by way of the memory bus 25. In accordance with the preferred embodiments, the memory boards are each hot pluggable. Further, the system can operate if only one memory board is in place or both boards are present. When only one memory board is present in the system and not operating in a mirrored mode, that board is said to be non-fault tolerant in that a failure of the board may take down the entire system. If both boards are present, the system can operate in a fault tolerant mode, such as a "mirroring" mode in which the same data is maintained on both boards. Then, if one board fails, the system can continue operating using the remaining functional board. In accordance with the preferred embodiment, the system permits a second board 40 or 42 to be hot plugged into the system currently operating in a non-fault tolerant mode, and the system, if so programmed, will automatically switch over to a fault tolerant mode such as a mirrored mode.

Because the memory boards 40, 42 are removable while the computer system is operational, there needs to be a way to electrically isolate each of the boards prior to their removal, as well as prior to their insertion. In the preferred embodiments, this is accomplished by way of a series of bi-directional switches, known in the industry as quick-switches (QS) 36. Although it may be possible to install on a computer or server motherboard a plurality of individual quick-switches, the preferred embodiments use a Pericom Semiconductor Corporation Part No. PI5C34171C.digital bus switch. The bus switch may be alternatively referred to as a bi-directional multiplexor/e-multiplexor.

Figure 2:
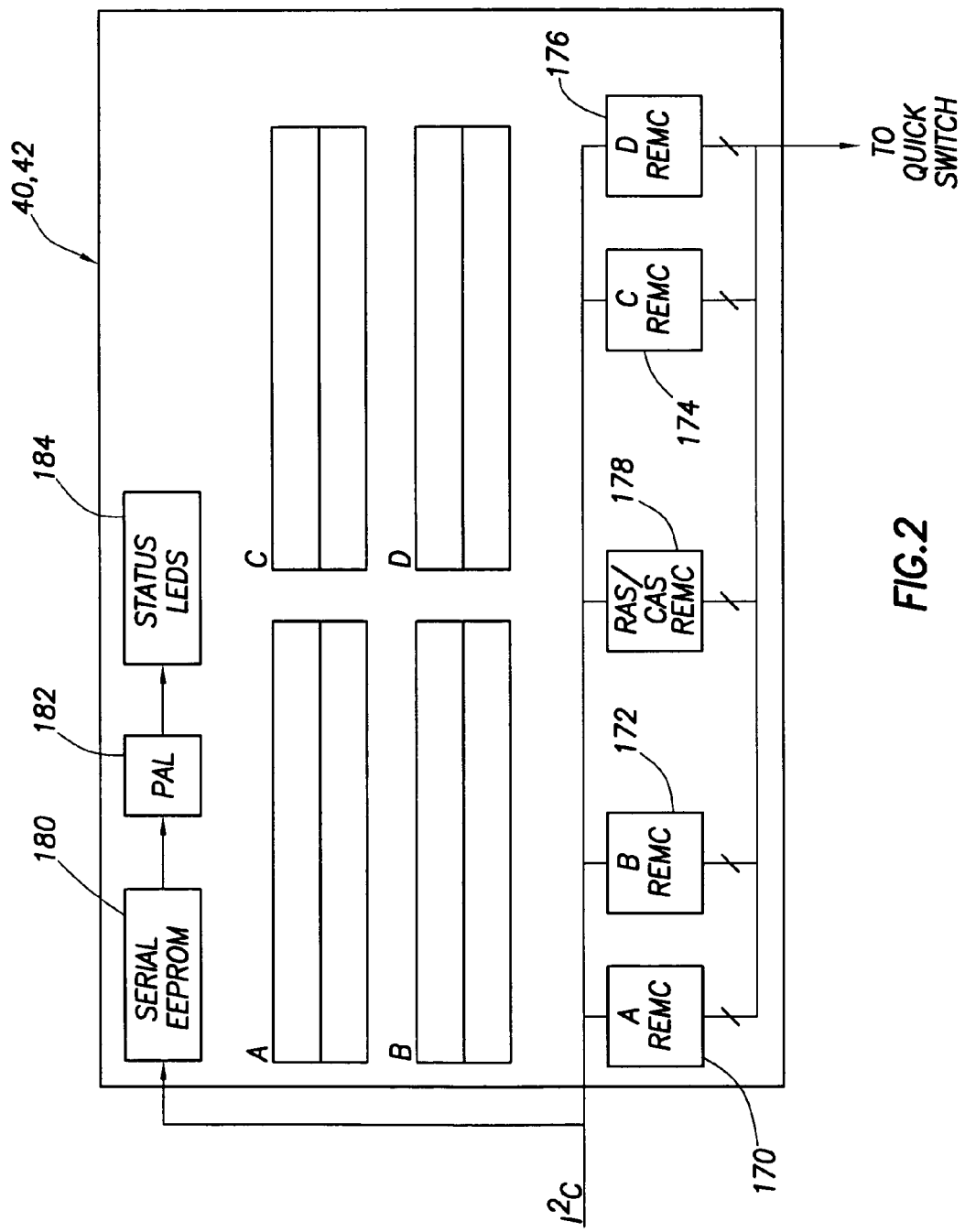
FIG. 2 shows a block diagram of a hot pluggable memory board usable in conjunction with the system of FIG. 1.

FIG. 2 shows a block diagram of a memory board 40, 42 constructed in accordance with preferred embodiments. In particular, each memory board is capable of accepting up to eight DIMM modules. The memory preferably implemented in the DIMMs is DDR SDRAM ranging from 128 megabytes to 2.0 gigabytes per DIMM device. Thus, a single memory board may be capable of implementing up to sixteen gigabytes of RAM, and with two memory boards in a computer system up to 32 gigabytes may be implemented. Still referring to FIG. 2, each of the slots marked A, B, C, D is capable of accepting up to two DIMM modules. Associated with each of the groups A, B, C, D is a reliability enhanced memory controller (REMC). In particular, REMCs 170, 172, 174 and 176 are coupled to the DIMM module groups A, B, C and D. In general, each memory module is not associated with a particular REMC. Instead, each memory module group (i.e., DIMM group) uses each REMC for data transfers. Thus, each REMC is used for each memory transfer rather than a particular REMC being used for transfers to a particular DIMM group. In the preferred embodiments the REMCs are manufactured by Server Works Inc., having a part no. NECD8491051012. The memory board preferably includes an additional REMC device 178 which preferably is responsible for generation of the row address strobe (RAS) arid column address strobe (CAS) functions, well known to those of ordinary skill in the art. Although not specifically shown in FIG. 2, each of the REMC devices 170, 172, 174, 176, 178 are coupled to the memory bus 25, and are thus capable of performing the steps necessary for reading and writing data from and to the memory board.

The memory boards of the preferred embodiment also implement a series of status LEDs 184 to indicate to the user the status of the various DIMM devices, or the overall memory board, when the unit is installed in a server system. In particular, the memory boards 40, 46 preferably comprise a serial electrically erasable programmable read only memory (EEPROM) 180 coupled to the I²C bus. In accordance with the preferred embodiments, the serial EEPROM is part no. 9559 manufactured by Philips Semiconductor. The serial EEPROM 180 is preferably written across the serial I²C bus, and the registers written may be accessed in a parallel fashion. Thus, when either the ROM code desires to light, or change the status of, one of the LEDs 184 on the memory boards 40, 42, preferably a corresponding bit in the serial EEPROM 180 is asserted. Thereafter, the PAL 182 reads the bit or code written to the serial EEPROM 180, and drives an appropriate LED in the plurality of the status LEDs 184.

Having now discussed the hardware to implement the hot puggable memory boards in a computer or server system, the discussion now turns to the steps necessary for implementing hot mirroring, in general, this process includes two main steps. First, the user hot installs a second memory board in a system that currently has only one memory board and is not operating in a mirroring mode and the system enables operation of the newly installed memory board. The second step is switch from the non-mirroring mode to the mirroring mode. Copending application entitled "Computer System Architecture With Hot Pluggable Main Memory Boards." Ser. No. 10/179,001, incorporated herein by reference, provides a detailed description of a computer system accommodates hot pluggable memory boards. Other than by reference, the present disclosure does not explicitly repeat much of that detail. Instead, the present disclosure focuses more on how the system switches to the mirroring mode once a user hot installs a memory board in the system.

Figure 3:
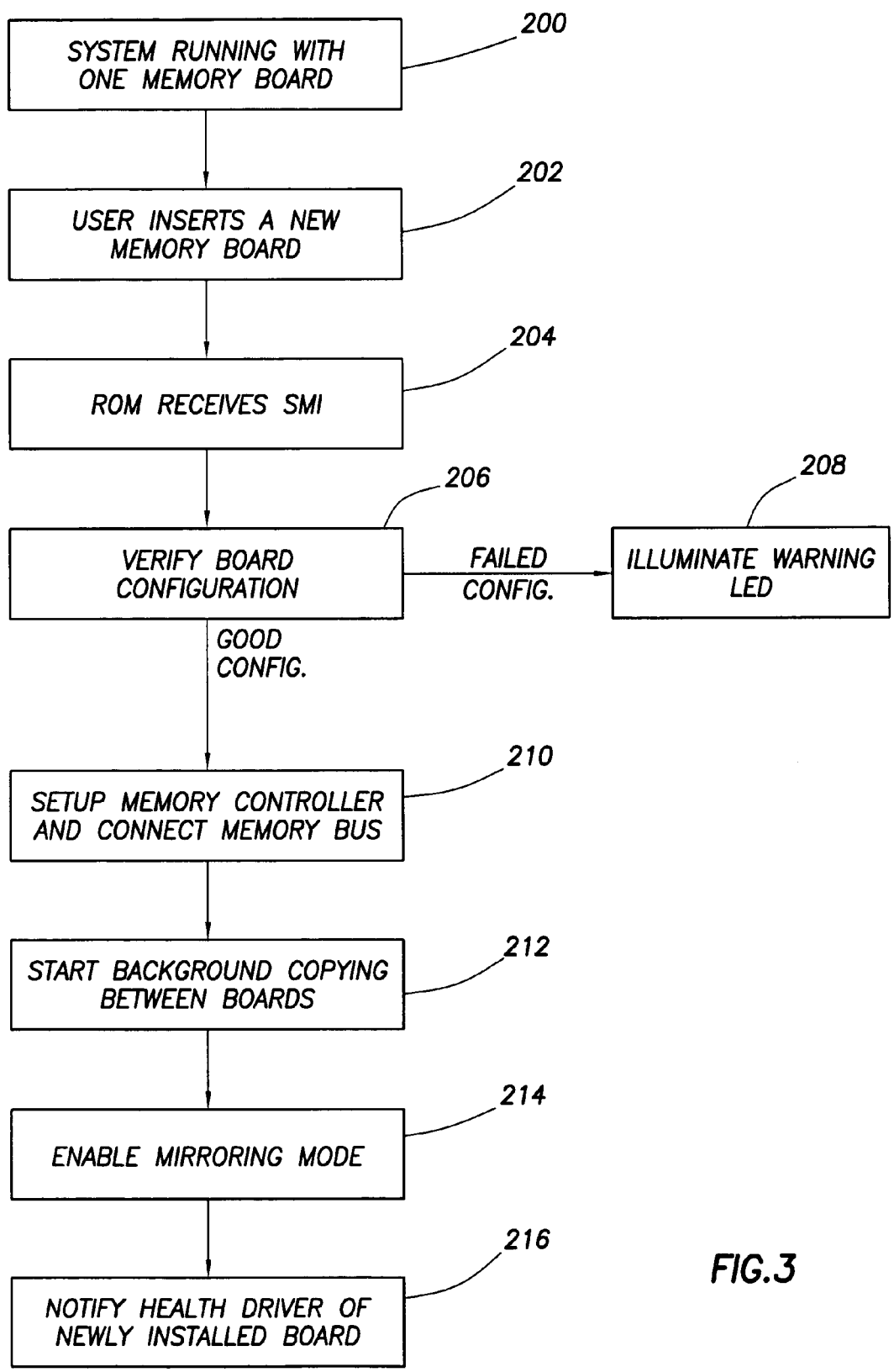
FIG. 3 shows a flow diagram for hot mirroring in accordance with the preferred embodiments of the invention.

Referring now to FIG. 3, a process shown in which hot mirroring is implemented using the system shown in FIG. 1. As described above, the preferred embodiment of the invention permits a memory board to be installed into a non-fault tolerant mode and the system will automatically accept the new board and switch to a fault tolerant mode, such as mirroring. Preferably, however, the system is programmable as to which mode it will operate in upon hot insertion of a memory board. For example, the user could decide that any hot plugged memory board will simply cause the system to accept the new board as additional memory, not as mirrored memory. Alternatively, and in accordance with the preferred embodiment of the invention, the system is programmed to switch to a mirroring mode upon detecting the presence of hot plugged memory board. This programmable feature preferably is implemented as part of the well known ROM-based setup utility (RBSU).

In step 200, the system is currently running with a single memory board 40, 42 in a non-mirrored mode of operation. Then, in step 202, a user inserts a second memory board into the system while the system is powered up and operational which causes an SMI to be generated and received by the BIOS code (step 204). In response to the SMI, the BIOS determines the configuration of the newly installed memory board in step 206. In accordance with the preferred embodiment the newly installed memory should be identical to the current board. Imposing this requirement on the preferred embodiment simplifies the system design. In other embodiments, however, the newly installed memory board need not be identical to the existing board. The step of verifying the configuration preferably is accomplished by the south bridge 30 reading configuration data stored in an EEPROM on the individual memory modules populating the memory boards via the I²C bus 45. Such configuration data preferably is stored on the memory board in accordance with the Serial Presence Detect (SPD) standard which specifies memory type, amount of memory, speed, manufacturer information, etc. If the newly installed board is not identical to the current board, then in step 208 the ROM code causes a warning LED 184 to illuminate and blink indicating such a failure and the process ends without going into a mirroring mode.

If the newly installed board passes the verification step 206, the process continues with step 210. Up until this point during the hot mirroring process, the hot plugged memory board is powered on and accessible by way of the I²C bus, but the main data and address busses preferably are not enabled yet via the quick switch 36. In step 210 once the board is correctly verified, the BIOS sets up the memory controller in the north bridge 22 and the south bridge 30 asserts an enable signal 48 to the quick switch 36 causing the new board's data and address busses to be electrically coupled to main memory bus 25.

By this point in the process, a new memory board has been hot plugged into the computer system. The newly installed board, however, is blank (i.e., contains no data). In step 212, the contents of the existing board are copied over to the new board so that both boards will contain an identical data set. In accordance with a preferred embodiment of the invention, this process occurs as a background process so that the system can continue normal operations while the data copying occurs. That is, normal reads and writes can occur while the transfer of data from one board to the other is occurring. Preferably, the data transfer between boards occurs through the memory controller in the north bridge 22 and without CPU involvement.

Once the data from the existing board to the new board has completed, memory mirroring is enabled (step 214) and the system configuration is changed to reflect this new mode of operation. If desired, LEDs 184 on the both boards can be illuminated to indicate that the memory system is operating in a mirroring mode. Finally, in step 216, the BIOS may notify a health driver of the installation of a new memory board so that new board can be included as part of the health and status monitoring capability of the computer. As noted above, other actions may occur as well to permit a new board to be hot plugged and such actions may be described in copending application entitled "Computer System Architecture With Hot Pluggable Main Memory Boards," Ser. No. 10/179,001.

In step 212, two general actions are occurring at the same time-normal system reads and writes (memory cycles caused by applications running on CPUs 20) as well as the background copying from the old to the new memory board. The background copying, of course, may have a performance impact on the normal operation of the system depending on how much data needs to be copied, the speed of the CPUs and busses and the volume of reads and writes that occur during the background copying. In general, a system with a large amount of memory may consume bandwidth for long periods of time. This problem may only become worse as the amount of memory in the system grows.

Thus, in accordance with a preferred embodiment of the invention, the computer system implements a throttling feature which permits a user to adjust how much bandwidth the background copying is permitted to use. In general, as the background copying is permitted to use more bandwidth, less bandwidth is available for normal operations. In this situation, the background copying may complete relatively quickly, but at the expense of impacting the performance of normal system operation. On the other hand, if the background copying is granted less bandwidth, it will take a longer period of time to complete the background copying, but normal system operations are impacted to a lesser degree. Moreover, with the throttling feature, the user can tradeoff background copying versus normal system performance.

Referring back to FIG. 1, the throttling feature is implemented in a register 60 provided in the north bridge 22 and associated with, or contained in, the memory controller included in the north bridge. Register 60 preferably is a programmable register which, in accordance with one embodiment of the invention, can be written with a value that will determine how often data is copied from the old board to the new board relative to other traffic in the system. A variety of implementations for this data value can be used. For instance, the value may be a time period (e.g., measured in microseconds) that specifies how often a block of data is permitted to be copied from the old board to the new board. For example, with the data value set at 256, the memory controller in the north bridge 22 will only copy a chunk of data from the old board to the new board every 256 microseconds and not more often than that. Alternatively, the data value may simply encode one of a plurality of background copying modes such as "fast copy" in which no limitation is placed on the background copying process, "medium fast copy" in which some predetermined amount of bandwidth is dedicated to the background copy process or "slow copy" in which most of the bandwidth is allocated for normal system operations and relatively little bandwidth is allocated for background copying.

The system described above thus advantageously implements hot mirroring for system memory thereby permitting a user to install a memory board in a system while it remains operational and the system will accept the new board and begin using it without any down time. Further, the system can be programmed to automatically switch to a mirroring mode upon the hot insertion of a new board. Finally, control is given to the user to dictate how fast the system will switch over to a mirroring mode.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a CPU;
a memory controller coupled to said CPU; and
a plurality of slots coupled to said memory controller in which hot pluggable memory boards can be inserted;
wherein, if one of the slots is currently occupied by a first memory board and a second memory board is inserted into the other slot while the computer is operating, the memory controller will automatically copy the contents of the first memory board to the second memory board and then enable a mirroring mode of operation in which write cycles to memory are performed to both memory boards;
further including a bridge device coupled to said memory controller and said memory boards and wherein the contents of the first memory board are copied to the second memory board after said bridge device determines that the second memory board is identical to the first memory board.

2. The computer system of claim 1, wherein the bridge device is coupled to said memory boards via a serial bus and the bridge device determines whether the second memory is identical to the first memory board by reading configuration information stored in a non-volatile memory located on said second memory board.

3. The computer system of claim 2, wherein the configuration information is conveyed via an I$^2$C bus.

4. The computer system of claim 1 wherein the contents of the first memory board are copied to the second memory board in a background mode while other read and write cycles are permitted to occur.

5. The computer system of claim 4 wherein said memory controller is associated with a programmable register that a user can set to a value, said value effects how fast the contents of the first memory board will take to be copied to the second memory board.

6. The computer system of claim 5 wherein said value encodes a mode that, in turn, effects how fast the contents of the first memory board will take to be copied to the second memory board.

7. The computer system of claim 1 further including a quick switch disposed between said memory controller and said memory boards.

8. The computer system of claim 1 wherein before the second memory board is inserted into the other slot, the first memory board is operating in a non-mirroring mode.

9. The computer system of claim 1 wherein before the second memory board is inserted into the other slot, the first memory board is operating in a non-fault tolerant mode.

10. A memory subsystem usable in an electronic system, comprising:
a memory controller;
a quick switch coupled to said memory controller;
a plurality of slots coupled to said memory controller in which hot pluggable memory boards can be inserted;
wherein, if one of the slots is currently occupied by a first memory board and a second memory board is inserted into the other slot while the computer is operating, the memory controller will automatically copy the contents of the first memory board to the second memory board and then enable a mirroring mode of operation in which write cycles to memory are performed to both memory boards; and a bridge device coupled to said memory controller and said memory boards and wherein the contents of the first memory board are copied to the second memory board after said bridge device determines that the second memory board is identical to the first memory board.

11. The memory subsystem of claim 10, wherein the bridge device is coupled to said memory boards via a serial bus and the bridge device determines whether the second memory is identical to the first memory board by reading configuration information stored in a non-volatile memory located on said second memory board.

12. The memory subsystem of claim 11, wherein the configuration information is conveyed via an I$^2$C bus.

13. The memory subsystem of claim 10 wherein the contents of the first memory board are copied to the second memory board in a background mode while other read and write cycles are permitted to occur.

14. The memory subsystem of claim 13 wherein said memory controller is associated with a programmable register that a user can set to a value, said value effects how fast the contents of the first memory board will take to be copied to the second memory board.

15. The memory subsystem of claim 14 wherein said value encodes a mode that, in turn, effects how fast the contents of the first memory board will take to be copied to the second memory board.

16. The memory subsystem of claim 10 wherein before the second memory board is inserted into the other slot, the first memory board is operating in a non-mirroring mode.

17. The memory subsystem of claim 10 wherein before the second memory board is inserted into the other slot, the first memory board is operating in a non-fault tolerant mode.

18. A computer system, comprising:
a CPU;
a memory controller coupled to said CPU; and
a plurality of slots coupled to said memory controller in which hot pluggable memory boards can be inserted;
wherein, if one of the slots is currently occupied by a first memory board and a second memory board is inserted into the other slot while the computer is operating, the memory controller will automatically copy the contents of the first memory board to the second memory board and then enable a mirroring mode of operation in which write cycles to memory are performed to both memory boards;
wherein the contents of the first memory board are copied to the second memory board in a background mode while other read and write cycles are permitted to occur;
wherein said memory controller is associated with a programmable register that a user can set to a value, said value effects how fast the contents of the first memory board will take to be copied to the second memory board;
wherein said value is a time value.

19. A memory subsystem usable in an electronic system, comprising:
a memory controller;
a quick switch coupled to said memory controller; and
a plurality of slots coupled to said memory controller in which hot pluggable memory boards can be inserted;
wherein, if one of the slots is currently occupied by a first memory board and a second memory board is inserted into the other slot while the computer is operating, the memory controller will automatically copy the contents of the first memory board to the second memory board and then enable a mirroring mode of operation in which write cycles to memory are performed to both memory boards:
wherein the contents of the first memory board are coupled to the second memory board in a background mode while other read and write cycles are permitted to occur;
wherein said memory controller is associated with a programmable register that a user can set to a value, said value effects how fast the contents of the first memory board will take to be copied to the second memory board;
wherein said value is a time value.

20. A method of hot mirroring system memory in a computer system, comprising:
operating a single first memory board in a non-mirrored mode; inserting a second memory board into the computer system while the computer system is operational;
verifying that the second memory board is identical to the first memory board;
if the second memory board is identical to the first memory board, copying the contents of the first memory board to the second memory board; and
enabling a mirroring mode in which write cycles are performed to both memory boards.

21. The method of claim 20 wherein copying the contents of the first board to the second board occurs as a background operation.

22. The method of claim 20 wherein verifying that the second memory board is identical to the first memory board includes reading configuration from the second memory board via a serial bus before parallel data and address busses are enabled to said second memory bus.

23. The method of claim 20 wherein if the second memory board is not identical to the first memory board, discontinuing the hot mirroring method.

* * * * *

UNITED STATES PATENT AND TRADEMARK OFFICE
CERTIFICATE OF CORRECTION

PATENT NO. : 7,028,215 B2  
APPLICATION NO. : 10/178981  
DATED : April 11, 2006  
INVENTOR(S) : Kevin G. Depew et al.

Page 1 of 1

It is certified that error appears in the above-identified patent and that said Letters Patent is hereby corrected as shown below:

In column 7, line 7, delete "2O" and insert -- 20 --, therefor.

In column 10, line 19, in Claim 19, delete "boards:" and insert -- boards; --, therefor.

In column 10, line 21, in Claim 19, delete "coupled" and insert --copied --, therefor.

Signed and Sealed this

Nineteenth Day of May, 2009

JOHN DOLL
*Acting Director of the United States Patent and Trademark Office*